Patented Mar. 18, 1941

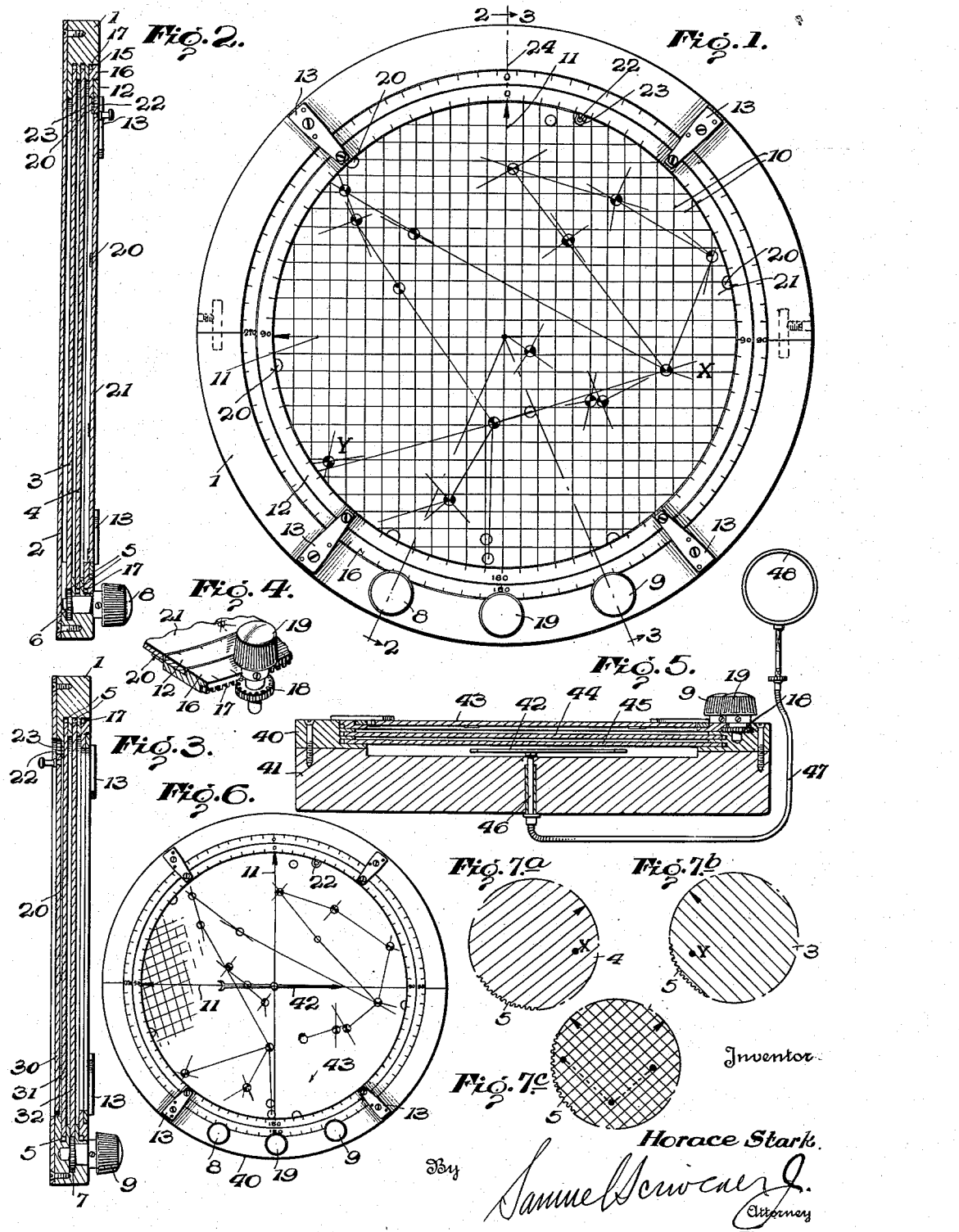

2,235,177

UNITED STATES PATENT OFFICE 2,235,177

POSITION FINDER

Horace Stark, Washington, D. C.

Application June 8, 1938, Serial No. 212,575

14 Claims. (Cl. 33—1)

This invention relates generally to navigating instruments and, more particularly, to devices and systems for determining the point of location on the surface of the earth or in space of a fixed or moving body upon which the device or system of the invention is located.

It is an object of the invention to provide a device of the character described which may be operated to align direction-indicating portions thereof with two or more points, the locations of which are known, and which direction-indicating portions will determine by their intersection over the face of a map included in the device the point of location of the device or of the vehicle upon which it is carried or the point at which it is located.

It is also an object of the invention to provide a position finding device of the general type described which will include direction or bearing indicating means each of which will include a number of parallel bearing indicators, whereby the parallel indicators of the respective indicating means will, by their disposition over substantially the entire area of a map employed with the device, provide a large number of reference points on the map and a large number of bearing lines, thereby facilitating the taking of bearings and the plotting of points of location.

It is a further object of the invention to provide a position finding device of the general type described with which will be associated means which are responsive to the position taken by a bearing indicating device and which means may be employed in orienting the bearing-indicating positions of the position finding device.

It is a still further object of the invention to provide a position finding device which will be simple in construction and which may be quickly and simply operated to effect the intended function.

Other objects and features of novelty will be apparent from the following description and the annexed drawing, it being clearly understood, however, that such description and drawing are merely illustrative of the invention and impose no limits on the spirit or scope thereof.

Referring to the drawing, in which similar reference numerals refer to like parts, Fig. 1 is a plan view of a position finding device formed according to my invention.

Fig. 2 is a sectional view taken on the line 2—2 of Fig. 1;

Fig. 3 is a sectional view taken on line 2—3 of Fig. 1 and showing a modified form of my invention;

Fig. 4 is a perspective view showing the relation of certain parts in apparatus formed according to my invention;

Fig. 5 is a view, partly in section, showing a modified form of my invention together with means for operating parts thereof;

Fig. 6 is a plan view of the position indicator portion of the device illustrated in Fig. 5, and Figs. 7a, 7b and 7c are diagrammatic views illustrating the mode of employing my invention.

This invention makes use of the well-known position finding procedure known as triangulation and is particularly intended to provide a new, improved and simple device for accurately determining position by this procedure. In triangulation, bearings are taken from an unknown point on at least two points of known location, and these bearings are plotted on a map, each bearing being extended through the known point in the line of the bearing. The point of intersection of these bearing lines indicates on the map or chart the location of the point from which the bearings were taken.

Means are provided by the present invention for plotting bearings taken on at least two separated points and securing from the intersection of the bearing lines the location of the point from which the bearings were taken. One form which my invention may take is illustrated in Figs. 1 and 2 and, referring to these figures, it will be seen that the disclosed device comprises an apparatus having a preferably circular body portion 1 which is formed in the shape of a ring and the rear face of which is closed by a backing plate 2. Rotatably mounted within the body portion 1, and being preferably slightly larger in diameter than the circular opening therein, are two plates 3, 4, both of which are provided at their peripheries with gear teeth 5 which mesh separately with pinion gears 6, 7 which are connected to operating knobs 8, 9 which are arranged on the front portion of the ring-shaped body portion 1, and each of which may be operated to cause the rotation of one of the plates 3, 4. The plates 3, 4 are formed of transparent material such as glass and each of these plates is marked with a series of parallel lines 10 which are spaced equal and suitable distances apart on each plate. The center, or diametrical, line 11 of each plate is accentuated, as by distinctive coloring or by making it darker than other lines, and each center line is provided at one end with an indicium such as an arrow. The arrows of the two lines 11 are adapted to be moved over a ring-shaped scale 12 which is arranged concentrically within the ring-shaped body portion 1. The scale 12 may be supported in such position that its outer face is flush with the outer surface of the body position 1 by means of bridge supports 13 which are connected at their opposite ends to the body portion 1 and to the scale 12. It will be seen that the scale 12 is spaced inwardly from the inner periphery of the body portion 1, this for a purpose which will appear hereinafter.

Formed in the inner periphery of the front face of the body portion 1 is an annular recess 15 within which is rotatably mounted a ring shaped scale 16 the face portion of which is arranged in the annular space between the scale 12 and the body portion 1. The outer periphery of the scale 16 is provided with gear teeth 17 which mesh with the teeth of a pinion gear 18 which is connected to an operating knob 19 which is preferably arranged between the knobs 8, 9 on the front face of the body portion 1. Injury of the face portion of the scale 16 the scale is extended below the scale 12 and the inner periphery of this underlying portion is provided with a plurality of spaced, inwardly-extending plates 20 which provide a surface upon which a transparent map or chart 21 may be positioned and supported. Obviously, as an alternative construction, the inner periphery of the underlying portion of the scale 16 may be extended inwardly to provide an annular ledge upon which the peripheral portion of the map may be supported. A pin 22 is mounted on one of the plates 20, or upon the corresponding annular support if the modified form is employed, and this pin is adapted to engage in one of a plurality of notches or apertures 23 formed in the peripheral edge of the map 21. It will be seen that the map may be maintained in any desired position with respect to the scale 16 by properly positioning one of the notches 23 on the pin 22. A pin 25 may be attached to the map by any suitable means in order to facilitate the placing of the map on the ledge 20 and its removal therefrom.

It will be seen that the map is rigidly connected to the rotatable scale 16 by the described means and may be oriented with respect to a fixed point 24 by means of the knob 19. The scale 16 is therefore referred to as the map scale or map azimuth and is divided into a suitable number of equal divisions denoted by lines numbered from 0 to 360 by proper increments.

The scale 12 is fixed with respect to the outer body portion 1 and is divided into two series of indicia, each extending through 180° in opposite directions from a zero indication and each being divided into a suitable number of equal divisions denoted by lines numbered from 0 to 180 by proper increments. The center lines 11 of the two series of parallel lines are moved with respect to this scale and accordingly the scale 12 may be referred to as the inner or bearing scale.

The map 21 represents a known portion of an area which is being traversed and preferably the only markings on this map are radiating stations or landmarks, such as broadcasting stations, radio beacons, lights, etc., which may be used in determining position. In describing the invention it will be assumed that the map shows only stations which are sources of radio emanations and that these are properly located and marked on the map as clearly illustrated in Fig. 1. It will be seen that if the device is viewed as seen in Fig. 1 the lines on the two plates 3, 4 will be seen below the map 20, inasmuch as the maps and the plates are transparent.

In describing the operation and use of the invention, it will be assumed that the pilot of an airplane, which is provided with a compass, wishes to determine his position. If the described device is not properly mounted in a fixed position in the aircraft the pilot will first place it in horizontal position, with the index line 24 thereof aligned with the index line of the compass. The pilot now reads the azimuthal heading of the plane from the compass and operates the knob 19 to rotate the map or azimuthal scale 16 until the proper azimuth reading thereon is opposite the fixed indicium 24. The map will now be properly positioned with respect to North and the various courses shown by the map will be aligned and parallel with the corresponding real courses. Any necessary correction for magnetic deviation may be made in setting the azimuth scale.

With the map oriented in the manner described, a bearing may now be taken by any suitable means on a radiating station which is shown on the map, such for example as station X. When the bearing of this station has been secured, one of the plates, such as plate 4, is rotated by means of the knob 9 and the connecting gearing until the center line 11 on that plate is opposite the corresponding and proper bearing indication on the bearing scale 12. Such orientation of the plate 4 is illustrated in Fig. 7a. A bearing is now taken on a second station Y and when this bearing has been secured the second plate 3 is rotated until the center line 11 thereon points to the corresponding indication on the bearing scale 12, such orientation of the plate 3 being illustrated in Fig. 7b.

It will now be seen that if a line be projected through station X on the map 21 and parallel to the lines on plate 4, such line will connect the station X and the point from which the bearing on that station was taken. Similarly, a line through station Y parallel to the lines on plate 3 will pass through the point from which the bearings on station Y were taken. These projected lines are illustrated in Fig. 7c and, as indicated, their intersection denotes on the map the location of the point from which the two bearings were taken. This point may be checked by bearings on other stations which are shown on the map.

A modified form of the invention disclosed in Figs. 1 and 2 is illustrated in Fig. 3 and it will be seen that in this embodiment the map 30 is disposed at the rear of the body portion of the device, and is accordingly viewed through the two transparent lined plates 31, 32 which correspond in every respect to the plates 3, 4 of Figs. 1 and 2. This form of the invention is similar in all respects, except the positioning of the map, to that disclosed in Figs. 1 and 2 and described hereinbefore.

A further, and preferred, form which my invention may take is illustrated in Figs. 5 and 6. In this embodiment, a position indicating device 40 similar in all respects to that illustrated in Figs. 1 and 2, or in Fig. 3, is provided, being modified only in that the backing plate 2 which is illustrated in Fig. 2 is omitted. The position indicating device 40 is preferably permanently mounted in horizontal position and is disposed above, and preferably attached to, an azimuth indicator 41 which includes a pointer 42. It will be apparent that the pointer 42 will be visible through the transparent map 43 and the transparent lined plates 44 and 45. The pointer 42 is carried by and fixed to a rotatable shaft 46 which is connected, as by flexible shafting 47, to a rotatable loop 48 which forms the energy pick-up means of a radio receiver, not shown.

It is well known that if the radio receiver is tuned to a broadcasting station or other source of radio radiations and the loop is swung until a minimum, or null, signal is received, the plane of the loop will then be at right angles to a line passing through the source of radiations and the center of the loop. This effect is employed in operating the disclosed position finder device. In such operation, the radio receiver is tuned to a selected station which is shown on the map 43 and the loop 48 is rotated until a minimum signal is received. The pointer 42, which moves with the loop, will now indicate the azimuthal bearing of the source of received radiations. One of the lined plates, such as 44 is now rotated, by proper operation of its knob, until the lines thereon are parallel to the pointer 42. The radio receiver is again tuned to a source of radiations which is located on the map 43 and again the loop is turned until a minimum signal is received. The pointer 42 will now lie in the direction of the second station and the second plate 45 is now turned, by operation of its knob, until the lines thereon are parallel to the new position of the pointer. The procedure described hereinbefore is again followed and lines are projected through the two stations on the map, these lines being made parallel to the lines on the respective plates. The intersection of these lines will indicate on the map the location of the point from which the bearings on the two stations were taken.

The setting of the map in proper position with respect to North and the correction of the settings of the map and plates to correct for magnetic deviations will be made in the operation of the system illustrated in Figs. 5 and 6 in the same manner as was described in connection with the operation of the devices illustrated in Figs. 1, 2 and 3. It will be seen that the bearing indicating means provided in the system of Figs. 5 and 6 will provide a simple and easily operable means for securing bearings and providing indications of these which may be employed in positioning the lined plates.

In the operation of the various embodiments of the invention, as hereinbefore described, it has been assumed that at least two bearings were required in order to fix the point of location. This will not be true if a mobile vehicle, such as an aircraft, is following a known course and it is desired to fix the position of the aircraft along the course. This may be achieved by taking only a single bearing. In securing a position indication under these circumstances, the map is first oriented to its proper position with respect to north, this being done by rotating the map and its scale until the fixed line 24 indicates on the map scale the azimuthal course of the aircraft, corrections being made for magnetic deviations. A bearing is now taken on any landmark which is located on the map and the one of the lined plates is rotated until the lines thereon are parallel to the observed bearing. A line is now projected through the observed station or landmark and parallel to the lines on the adjusted plate. The intersection of this projected line with the course being followed, which, it is assumed, is set out on the map, will denote the location of the point from which the bearing was taken. It will be apparent that if position is to be determined only by this method, only a single lined plate need be provided.

While I have described and illustrated a number of forms which my invention may take, it will be apparent to those skilled in the art that other modifications and improvements may be made without departing in any way from the spirit or scope of the invention, for the limits of which reference must be had to the appended claims.

What I claim is:

1. A navigating instrument comprising a map or chart mounted for adjustment to any desired azimuthal position, means providing a plurality of spaced parallel lines in superposed relation to said map or chart and extending over substantially the entire face thereof, means providing a second plurality of spaced parallel lines in superposed relation to said map or chart and extending over substantially the entire face thereof, means for orienting said map or chart to any desired azimuthal position, and means for separately orienting said two pluralities of lines to a desired angular relation in which each of said pluralities of lines is disposed in alignment with a selected bearing.

2. A navigating instrument comprising a map or chart mounted for adjustment to any desired azimuthal position, means providing a plurality of spaced parallel lines in superposed relation to said map or chart and extending over substantially the entire face thereof, means providing a second plurality of spaced parallel lines in superposed relation to said map or chart and extending over substantially the entire face thereof, means for rotating said map or chart in its own plane, means for indicating the azimuthal position of said map or chart, means for separately orienting said two pluralities of lines to a desired angular relation, and means for indicating the azimuthal bearing of each of said pluralities of lines.

3. A navigating instrument comprising a ring-shaped body portion, a plurality of circular plates each having its peripheral portion mounted in said ring-shaped body portion and each having a plurality of spaced parallel lines marked thereon, means for separately rotating said plates, a scale fixed to said body portion and disposed in such relation to said plates as to indicate the angular relation of the lines on said plates, a second scale rotatably carried by said body portion and adapted to have a map or chart mounted thereon.

4. A navigating instrument comprising a ring-shaped body portion, means carried by said body portion and having a plurality of spaced parallel lines carried thereby, a second means carried by said body portion and having a plurality of spaced parallel lines carried thereby, the lines of both said means extending over substantially the entire opening in said ring, means for rotating both of said line-carrying means with respect to said body portion, and means carried by said body portion and adapted to receive a map or chart.

5. A navigating instrument comprising a ring-shaped body portion, a transparent plate carried by said body portion and having a plurality of spaced parallel lines marked thereon, a second transparent plate carried by said body portion and having a plurality of spaced parallel lines marked thereon, the lines of both said plates extending over substantially the entire opening in said ring, means for rotating both of said plates with respect to said body portion, and means carried by said body portion and adapted to receive a map or chart.

6. A navigating instrument comprising a ring-shaped body portion, a transparent plate carried by said body portion and having a plurality of spaced parallel lines marked thereon, a second transparent plate carried by said body portion and having a plurality of spaced parallel lines marked thereon, the lines of both said plates extending over substantially the entire opening in said ring, means for rotating both of said plates with respect to said body portion, a ring-shaped scale carried by said body portion and adapted to indicate the angular positions of the lines on said plates, means carried by said body portion and adapted to receive a map or chart in superposed parallel relation to said plates.

7. A navigating instrument comprising a ring-shaped body portion, a transparent plate carried by said body portion and having a plurality of spaced parallel lines marked thereon, a second transparent plate carried by said body portion and having a plurality of spaced parallel lines marked thereon, the lines of both said plates extending over substantially the entire opening in said ring, means for rotating both of said plates with respect to said body portion, a ring-shaped scale fixed to said body portion and adapted to indicate the angular positions of the lines on said plates, a second scale rotatably carried by said body portion and being so constructed as to support a map or chart in superposed parallel relation to said plates.

8. A navigating instrument comprising a ring-shaped body member, a plurality of superposed plates rotatably mounted in said body member and extending across the opening therein and each having a plurality of spaced parallel lines marked thereon, means for separately rotating said plates with respect to said body member, said body member being so constructed as to support a map or chart formed of transparent material above and in parallel relation to said plates.

9. A navigating instrument comprising a ring-shaped body member, a plurality of plates rotatably mounted in said body member and extending across the opening therein and each having a plurality of spaced parallel lines marked thereon, means for separately rotating each of said plates with respect to said body member, said body member being so constructed as to support a map or chart formed of transparent material in position above and in parallel relation to said plates, a means for causing the rotation of a map or chart positioned in said body member with respect thereto and to said plates.

10. A navigating instrument comprising an annular body member, a plurality of plates rotatably mounted in said body member and extending across the opening therein and each having a plurality of spaced parallel lines marked thereon, means for separately rotating said plates with respect to said body member, said body member being so constructed as to support a map or chart below and in parallel relation to said plates.

11. A navigating instrument comprising an annular body member which is so constructed as to have a map or chart rotatably mounted therein and extending across the opening therein, a plurality of plates rotatably mounted in said body member above the map supporting means therein, each of said plates extending across the opening in said body member and having a plurality of spaced parallel lines marked thereon, means for separately rotating said plates with respect to said body member and a map or chart mounted therein, and means for causing the rotation of a map or chart mounted in said body member with respect thereto and to said plates.

12. A navigating instrument comprising an annular body member which is so constructed as to have a map or chart formed of transparent material mounted therein, a plurality of transparent plates rotatably mounted in said body member below the map supporting means therein, each of said plates extending across the opening in the body member and having a plurality of spaced parallel lines marked thereon, and means for separately rotating said transparent plates with respect to said body member and a map mounted therein.

13. A navigating instrument comprising an annular body member which is so constructed as to have a map or chart formed of transparent material mounted therein, a plurality of transparent plates rotatably mounted in said body member below the map supporting means therein, each of said plates extending across the opening in the body member and having a plurality of spaced parallel lines marked thereon, means for separately rotating said transparent plates with respect to said body member and with respect to a map or chart mounted therein, and means for rotating a map or chart which is mounted in said body member with respect to said body member and to said transparent plates.

14. A navigating instrument comprising an annular body member which is so constructed as to have a map or chart mounted therein and extending across the opening therein, a plurality of transparent plates rotatably mounted in said body member and extending across the opening therein above the map supporting means therein and each having a plurality of spaced parallel lines marked thereon, and means for separately rotating said transparent plates with respect to said body member.

HORACE STARK.